(12) United States Patent
Garcia et al.

(10) Patent No.: US 9,822,537 B2
(45) Date of Patent: Nov. 21, 2017

(54) PERSONNEL SAFETY SHIELD AND SYSTEM

(71) Applicant: Inventus Holdings, LLC, Juno Beach, FL (US)

(72) Inventors: Gary M. Garcia, Hobe Sound, FL (US); Grayling Vander Velde, North Palm Beach, FL (US)

(73) Assignee: Inventus Holdings, LLC, Juno Beach, FL (US)

( * ) Notice: Subject to any disclaimer, the term of this patent is extended or adjusted under 35 U.S.C. 154(b) by 0 days.

(21) Appl. No.: 14/932,547

(22) Filed: Nov. 4, 2015

(65) Prior Publication Data

US 2017/0121989 A1    May 4, 2017

(51) Int. Cl.
| | | |
|---|---|---|
| *E04G 21/32* | (2006.01) | |
| *E04G 21/24* | (2006.01) | |
| *F03D 80/50* | (2016.01) | |

(52) U.S. Cl.
CPC ............ *E04G 21/32* (2013.01); *E04G 21/24* (2013.01); *F03D 80/50* (2016.05)

(58) Field of Classification Search
CPC ... E04G 21/32; E04G 21/3285; E04G 21/328; E04G 21/24; E04H 17/06; F03D 80/50
USPC .................. 52/3, 23, 741.3, DIG. 12, 13, 14
See application file for complete search history.

(56) References Cited

U.S. PATENT DOCUMENTS

| | | | | |
|---|---|---|---|---|
| 3,801,416 A * | 4/1974 | Gulbierz | ................... | F42D 5/05 102/303 |
| 4,010,822 A | 3/1977 | Banner | | |
| 4,249,589 A * | 2/1981 | Loeb | ....................... | E06B 9/521 160/354 |
| 4,263,347 A * | 4/1981 | Banta | .................. | B05B 15/0456 118/505 |
| 4,268,000 A * | 5/1981 | Ulm | .......................... | B44C 5/02 156/163 |
| 4,874,028 A * | 10/1989 | Lynch | .................... | A47H 99/00 160/126 |
| 5,251,412 A * | 10/1993 | de Almeida Borges | .. | E04B 7/00 52/109 |
| 5,306,861 A * | 4/1994 | Amos | .................... | B01D 46/06 160/368.1 |
| 5,939,658 A * | 8/1999 | Muller | ...................... | F41H 5/08 109/49.5 |
| 6,124,018 A * | 9/2000 | Yoshino | ............. | B05B 15/0456 118/504 |
| 6,308,474 B1 * | 10/2001 | Wilson | .................... | E04G 21/30 150/154 |
| 6,470,645 B1 | 10/2002 | Maliszewski et al. | | |

(Continued)

*Primary Examiner* — Paola Agudelo
(74) *Attorney, Agent, or Firm* — Tarolli, Sundheim, Covell & Tummino LLP

(57) ABSTRACT

A safety system may include a shield for protecting or shielding personnel operating in a personnel working area from a hazard provided on a structure. The structure may be a wind turbine, the hazard may be a projecting flange of the wind turbine tower, and the personnel working area may be a ladder inside the wind turbine tower. The shield may have a bend or curvature when installed in order to cover the hazard. The shield may include a plurality of wings projecting from an intermediary portion of the shield. The wings may be separated from each other by a wing gap. Other structures, working areas, and hazards are contemplated and described in the disclosure.

18 Claims, 3 Drawing Sheets

(56) References Cited

U.S. PATENT DOCUMENTS

| | | | | |
|---|---|---|---|---|
| 6,748,715 B1 * | 6/2004 | Black | ............ | A62B 1/22 |
| | | | | 257/E23.142 |
| 7,108,040 B2 * | 9/2006 | Whittemore | ............ | A47H 21/00 |
| | | | | 160/351 |
| 8,209,913 B2 | 7/2012 | Murata | | |
| 9,091,073 B2 * | 7/2015 | Wells | ............ | E04G 21/30 |
| 2003/0147753 A1 | 8/2003 | Ollgaard | | |
| 2004/0261346 A1 * | 12/2004 | Gibney | ............ | E04G 21/30 |
| | | | | 52/506.01 |
| 2009/0223139 A1 | 9/2009 | Meiners | | |
| 2010/0122508 A1 | 5/2010 | Kristensen | | |
| 2010/0281783 A1 * | 11/2010 | Harrington | ............ | E04H 9/14 |
| | | | | 52/2.23 |
| 2011/0140446 A1 | 6/2011 | Knoop | | |
| 2011/0248506 A1 | 10/2011 | Ruiz Urien et al. | | |
| 2014/0075860 A1 | 3/2014 | Edenfeld et al. | | |

* cited by examiner

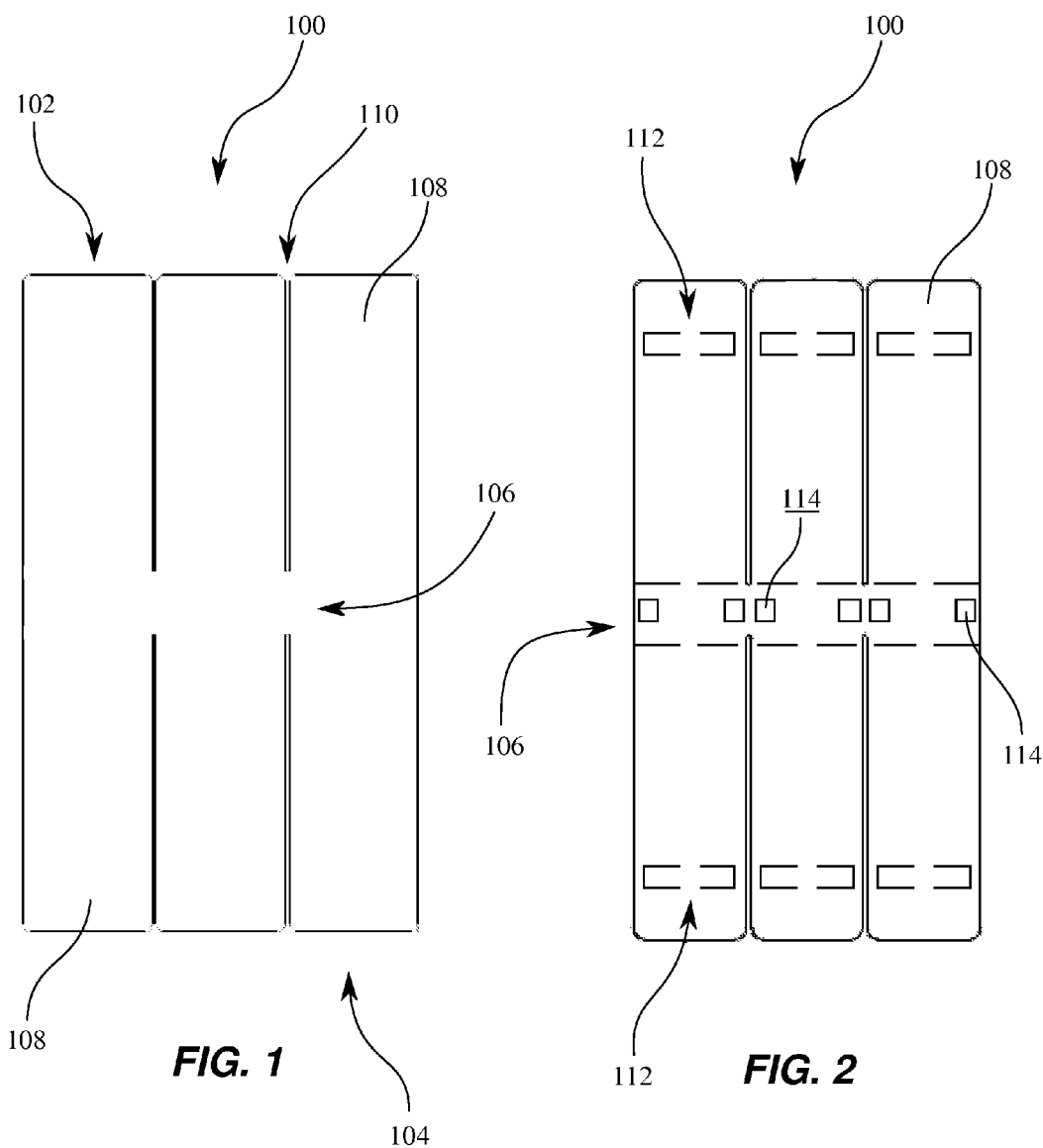

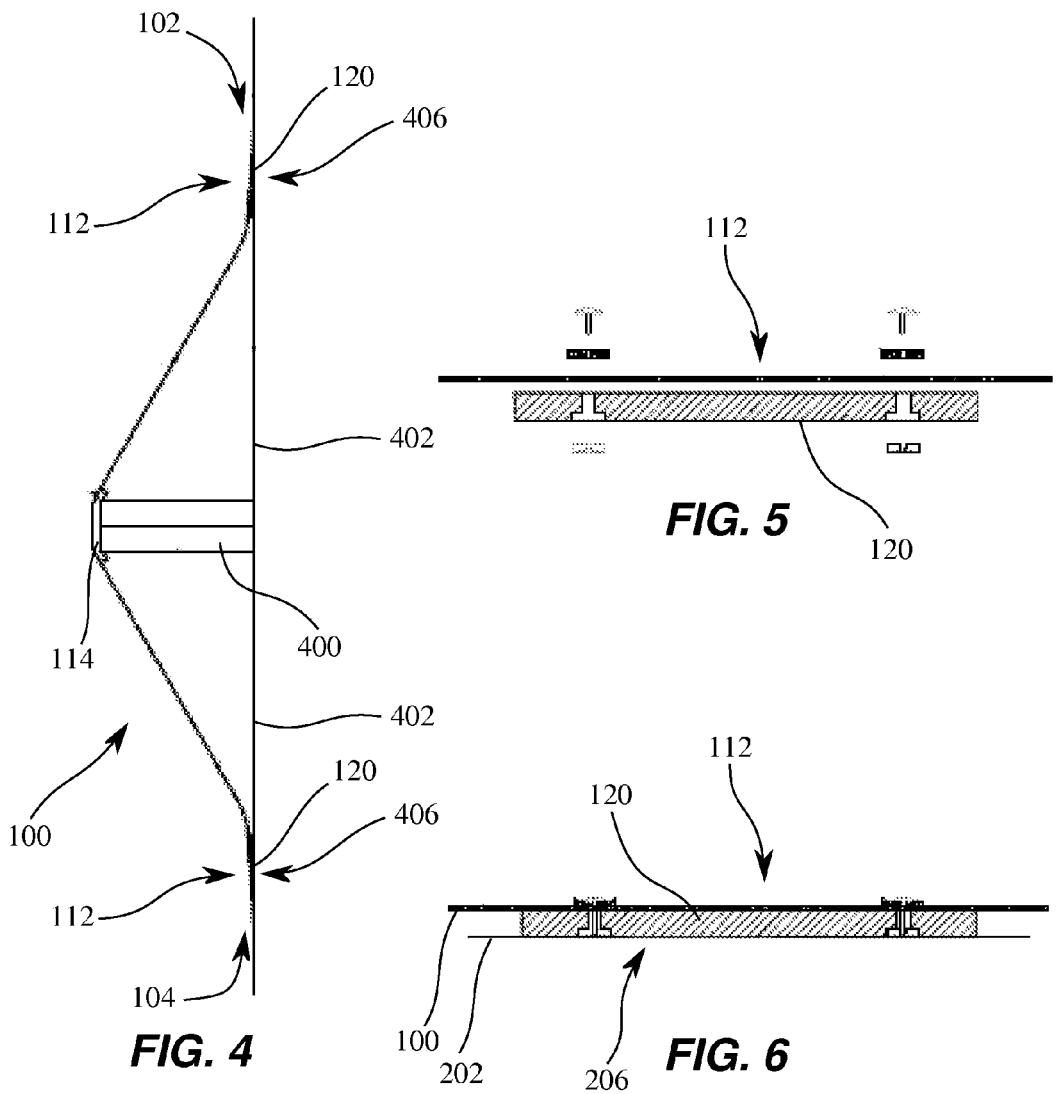
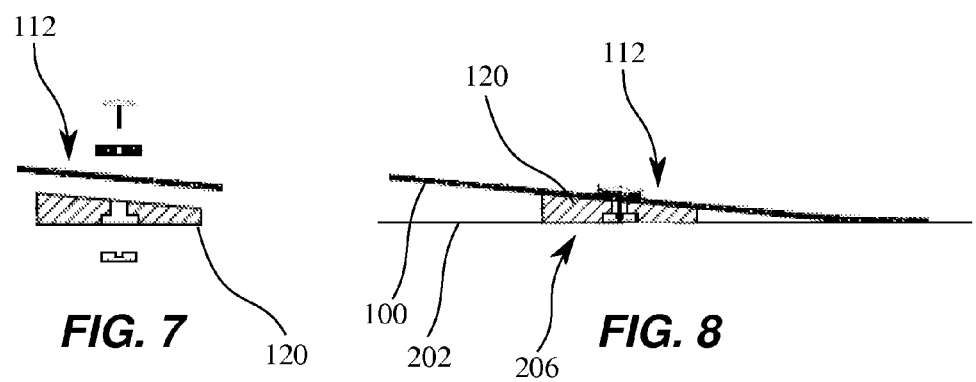

PERSONNEL SAFETY SHIELD AND SYSTEM

FIELD OF THE DISCLOSURE

This disclosure relates generally to devices and systems for improving the safety of maintenance personnel, workers or other individuals, and more particularly to improving the safety conditions for maintenance personnel, workers or other individuals as they climb or ascend structures.

BACKGROUND

Wind turbine technology is providing an ever-increasing proportion of the electrical energy generated in the United States and worldwide. Wind turbines transform kinetic energy, provided by a wind source, into mechanical energy, which may in turn be used to produce electricity. A typical wind turbine consists of an electrical generator mounted in a nacelle atop a tower that may be sixty (60) or more meters tall. As turbine tower designs evolve and heights become greater, some wind turbine towers supporting the nacelles are connected together in multiple sections joined by one or more flanges.

As with most mechanical machinery, periodic maintenance, refurbishing or repair is needed for wind turbines. Given the substantial height of turbines and their towers, maintenance personnel must necessarily ascend great heights in order to conduct uptower repair and maintenance of wind turbine components. Some wind turbines include ladders for the maintenance personnel to climb. In some turbine tower designs, a ladder is included on the interior of the turbine tower and ascends vertically through the tower towards the nacelle and other uptower turbine components. The safety of maintenance personnel is very much desired for operators and owners of wind turbines.

BRIEF SUMMARY OF THE DISCLOSURE

The following presents a simplified summary of the disclosure in order to provide a basic understanding of some aspects of the invention. This summary is not an extensive overview of every embodiment disclosed herein. It is intended to neither identify key or critical elements of the various embodiments nor delineate the scope of the disclosure. Its sole purpose is to present some concepts of the disclosure, in accordance with the various embodiments disclosed herein, in a simplified form as a prelude to the more detailed description that is presented later.

In one embodiment of the disclosure, a safety system may be provided for covering a hazard on a structure positioned proximate to a personnel working area. The safety system may include a shield having a length in a longitudinal direction and a width in a lateral direction. The shield may include a wing extending in the longitudinal direction from an intermediary portion of the shield to a first end of the shield, an additional wing extending in the longitudinal direction from the intermediary portion of the shield to a second end of the shield, an attachment area provided on the wing at a distance from the first end, and an additional attachment area provided on the additional wing at a distance from the second end. The safety system may further include a plurality of attachment devices, each attachment device securing either the attachment area to a structure securing area of the structure or the additional attachment area to an additional structure securing area of the structure. The intermediary portion of the shield may be positioned between the hazard and the personnel working area.

In another embodiment of the disclosure, a method for installing a safety system onto a portion of a structure may be provided in order to protect personnel in a working area from a hazard. The method may include providing a shield, and the shield may include a wing extending in a longitudinal direction from an intermediary portion of the shield to a first end of the shield, an additional wing extending in the longitudinal direction from the intermediary portion of the shield to a second end of the shield, an attachment area provided on the wing at a distance from the first end, and an additional attachment area provided on the additional wing at a distance from the second end. The method may then include marking, on the structure, a structure attachment area and an additional structure attachment area, an securing the attachment area to the structure attachment area and the additional attachment area to the additional structure attachment area with an attachment device, said securing thereby interposing the shield between the hazard and the working area.

In an additional embodiment of the disclosure, a safety system may be provided for covering a hazard on a structure in proximity to a personnel working area. The safety system may include a shield having a length in a longitudinal direction and a width in a lateral direction, the shield including a plurality of wings extending in the longitudinal direction from an intermediary portion of the shield, and an attachment area provided on each of the plurality of wings. The safety system may further include a plurality of attachment devices, each attachment device securing one of the attachment areas to the structure, whereby the intermediary portion of the shield is positioned between the hazard and the personnel working area.

The following description and the annexed drawings set forth certain illustrative aspects of the embodiments of the disclosure. These aspects are indicative, however, of but a few of the various ways in which the principles of the disclosure may be employed and the various embodiments are intended to include all such aspects and their equivalents. Other advantages and novel features will become apparent from the following description when considered in conjunction with the drawings.

BRIEF DESCRIPTION OF THE FIGURES

FIG. 1 illustrates a front view of an embodiment of a shield;

FIG. 2 illustrates a top front of an embodiment of a shield;

FIG. 4 illustrates a side view of the shield of FIG. 3 in the installed position;

FIG. 5 illustrates a side cross-section and exploded view of an embodiment of a connection device;

FIG. 6 illustrates a side cross-section and assembled view the connection device of FIG. 5;

FIG. 7 illustrates a side cross-section and exploded view of an embodiment of a connection device; and FIG. 8 illustrates a side cross-section and assembled view of the connection device of FIG. 7.

DETAILED DESCRIPTION

Figure 3:
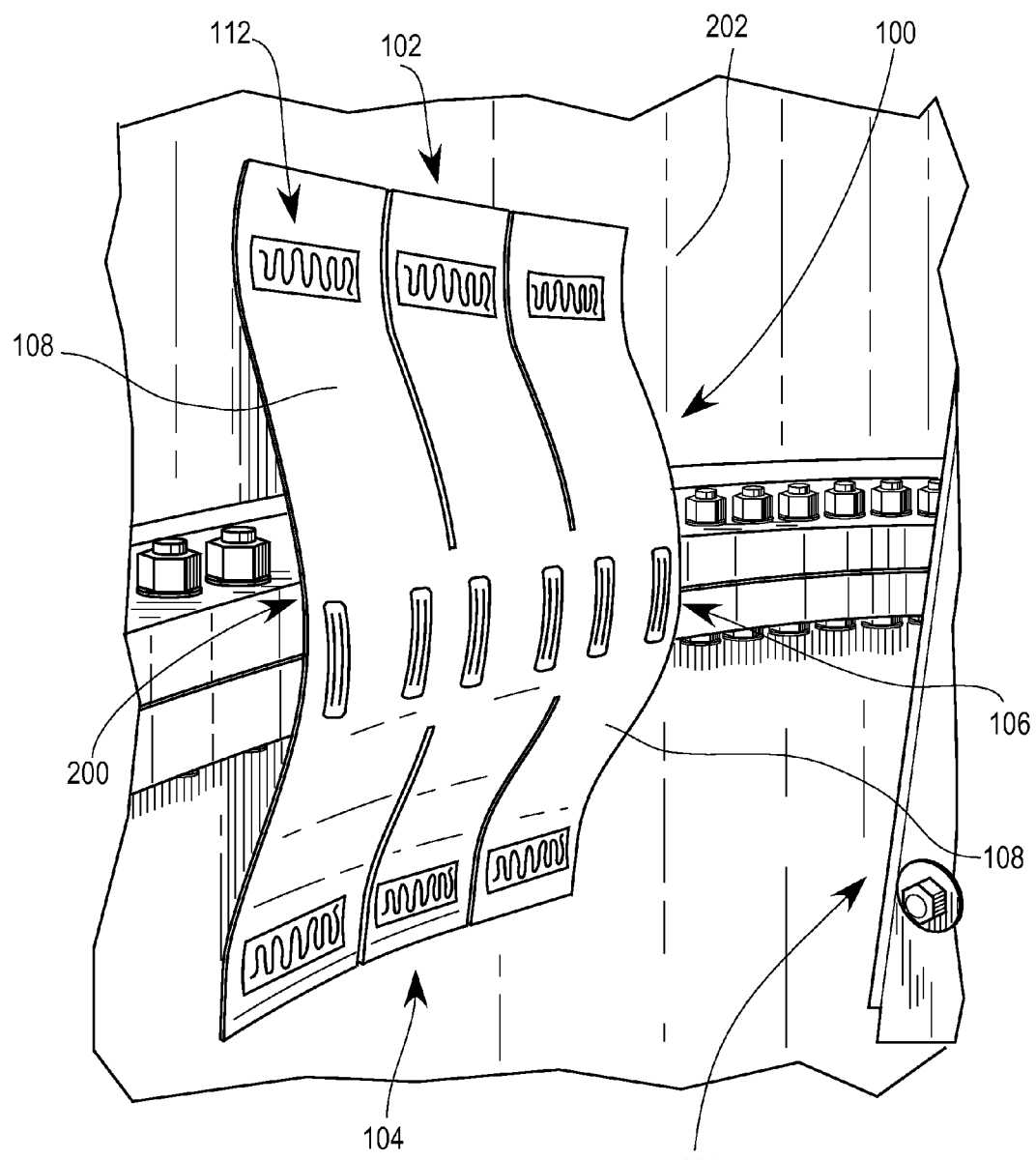
FIG. 3 illustrates a perspective view of an embodiment of a shield in an installed position.

The following detailed description and the appended drawings describe and illustrate some embodiments of the disclosure for the purpose of enabling one of ordinary skill in the relevant art to make and use these embodiments. As such, the detailed description and illustration of these embodiments are purely illustrative in nature and are in no way intended to limit the scope of the disclosure in any manner. It should also be understood that the drawings are not necessarily to scale and in certain instances details may have been omitted, which are not necessary for an understanding of the embodiments, such as details of fabrication and assembly. In the accompanying drawings, like numerals represent like components.

In this document, the terms "a" or "an" are used, as is common in patent documents, to include one or more than one. In this document, the term "or" is used to refer to a nonexclusive or, unless otherwise indicated. Furthermore, references to "one embodiment" or "an embodiment" are not intended to be interpreted as explicitly excluding the existence of additional embodiments that also incorporate the recited features. Moreover, unless explicitly stated to the contrary, embodiments "comprising," "including," or "having" an element or a plurality of elements having a particular property may include additional such elements not having that property.

In one embodiment of the disclosure, a safety system may be provided for covering a hazard on a structure positioned proximate to a personnel working area. The safety system may include a shield having a length in a longitudinal direction and a width in a lateral direction. The shield may include a wing extending in the longitudinal direction from an intermediary portion of the shield to a first end of the shield, an additional wing extending in the longitudinal direction from the intermediary portion of the shield to a second end of the shield, an attachment area provided on the wing at a distance from the first end, and an additional attachment area provided on the additional wing at a distance from the second end. The safety system may further include a plurality of attachment devices, each attachment device securing either the attachment area to a structure securing area of the structure or the additional attachment area to an additional structure securing area of the structure. The intermediary portion of the shield may be positioned between the hazard and the personnel working area.

Further embodiments of a safety system may include a buffer component provided on the intermediary portion of the shield. The shield may be in an installed position when the attachment area is secured with the structure securing area, the additional attachment area may be secured with the additional structure securing area, and the buffer component may be positioned adjacent to the hazard. The structure may be a wind turbine tower, the hazard may be a projecting flange of the wind turbine tower, and the personnel working area may be a ladder inside the wind turbine tower. The shield may further include a second wing extending in the longitudinal direction from an intermediary portion of the shield to a first end of the shield, and a second additional wing extending in the longitudinal direction from an intermediary portion of the shield to a second end of the shield. The lateral distance between the wing and second wing may be a wing gap, and the lateral distance between the additional wing and the second additional wing may be an additional wing gap. The second wing may include a second attachment area and the second additional wing includes a second additional attachment area. The wing gap and the additional wing gap may be the same distance. The shield may be symmetrical in both the longitudinal direction and the lateral direction. Each of the plurality of attachment devices may include a first hook and loop fastener secured to either the attachment area or the additional attachment area, and a second hook and loop fastener secured to either the structure securing area or the additional structure securing area. Each of the plurality of attachment devices may include a pad secured to either the structure securing area or the additional structure securing area, and a rivet for securing either the attachment area or the additional attachment area to the pad. A surface of the pad may have a slope with respect to the structure. The shield may be symmetrical in the longitudinal and the lateral directions.

In another embodiment of the disclosure, a method for installing a safety system onto a portion of a structure may be provided in order to protect personnel in a working area from a hazard. The method may include providing a shield, and the shield may include a wing extending in a longitudinal direction from an intermediary portion of the shield to a first end of the shield, an additional wing extending in the longitudinal direction from the intermediary portion of the shield to a second end of the shield, an attachment area provided on the wing at a distance from the first end, and an additional attachment area provided on the additional wing at a distance from the second end. The method may then include marking, on the structure, a structure attachment area and an additional structure attachment area, an securing the attachment area to the structure attachment area and the additional attachment area to the additional structure attachment area with an attachment device, said securing thereby interposing the shield between the hazard and the working area.

In further embodiments of a method for installing, the attachment device may be a hook and loop fastener. The structure may be a wind turbine tower, the hazard may be a projecting flange of the wind turbine tower, and the personnel working area may be a ladder inside the wind turbine tower the shield may curve over the hazard when installed.

In an additional embodiment of the disclosure, a safety system may be provided for covering a hazard on a structure in proximity to a personnel working area. The safety system may include a shield having a length in a longitudinal direction and a width in a lateral direction, the shield including a plurality of wings extending in the longitudinal direction from an intermediary portion of the shield, and an attachment area provided on each of the plurality of wings. The safety system may further include a plurality of attachment devices, each attachment device securing one of the attachment areas to the structure, whereby the intermediary portion of the shield is positioned between the hazard and the personnel working area.

In further embodiments of a safety system, the plurality of wings may include at least four wings with two wings projecting in one direction and the other two wings projecting in an opposed direction. The plurality of attachment devices may be hook and loop fasteners. The safety system may include a buffer component provided on the intermediary portion of the shield. The structure may be a wind turbine tower presenting a concave inner wall of the personal work area, the hazard may be a projecting flange of the concave inner wall of the wind turbine tower, the shield may conform to the concave inner wall in the lateral direction while forming a convex shield between the hazard and the personnel working area in the longitudinal direction, and the personnel working area may be a ladder inside the wind turbine tower.

With reference to FIG. 1, a safety device or shield 100 may be provided in order to protect personnel operating or moving within proximity to the shield 100. Shield 100 may be substantially elongate having a first end 102 and a second end 104, as well as an intermediary, middle, or center portion 106 between the first and second ends. One or more wings 108 may project from the intermediary portion 106. In the illustrated embodiment, three wings 108 project from intermediary portion 106 towards first end 102, and three wings 108 project from intermediary portion 106 towards second end 104. Adjacent wings 108 may be separated by a wing gap 110. In construction of shield 100, cut outs or slits may be made beginning at either first or second end 102, 104 and extending towards intermediary portion 106. The introduction of cut outs or slits may thereby create wing gaps 110 and accordingly define wings 108. In another construction method of shield 100, one or more wings 108 may be attached or secured to intermediary portion 106. Wing gaps 110 are optional in that a single wing 108 may project towards either first or second end 102, 104, and thus where only a single wing 108 is provided there will be no wing gap 110. A plurality of wings 108 with wing gaps 110 may improve the flexibility of shield 100 thus facilitating or improving the ability of shield 100 to bend or curve. Although not illustrated, the disclosure contemplates embodiments of shield 100 with wings 108 projecting laterally from intermediary portion 106 as opposed to longitudinally as illustrated. Shield 100 may thus include one or more laterally projecting wings 108 in addition to the illustrated longitudinally projecting wings 108. Additionally, the disclosure contemplates secondary wings projecting from one or more wings 108. In some embodiments, shield 100 may be a single integral piece while in other embodiments shield 100 may comprise multiple, joined pieces such as an intermediary portion 106 with wings 108 attached thereto. In some embodiment, wings 108 are sufficiently flexible to fold back, around, or proximate to intermediary portion 106 thereby permitting efficient storage and transportation of shield 100 prior to installation.

In the illustrated embodiments, shield 100 is substantially symmetrical in the lateral direction, the longitudinal direction, or both. That is, an equal number of wings 108 are provided extending towards both first end 102 and second end 104. Additionally, the illustrated embodiments show wing gaps 110 proximate first end 102 as substantially aligned with wing gaps proximate second end 104. Wings 108 are shown in the illustrated embodiments as having substantially the same dimensions. The length of the wings 108, defined as the distance from either first or second end 102, 104 and center portion 106, as well as the width of the wings 108, defined as the lateral distance across the wings which for instance may be the distance between wing gaps 110, are shown as substantially the same. A symmetrical shield 100 may be easier to install, in accordance with embodiments of installation procedures and methods as described herein. However, it should be understood that the disclosure contemplates non-symmetrical shields 100. For instance one or more wing gaps 110 may not align, wings 108 may have varying dimensions, and greater or fewer wings may be provided proximate first end 102 than second end 104. Additionally, dimensions of shield 100 may be varied depending on the shield's application, namely where the shield 100 is to be installed and to what environments the shield will be exposed.

Shield 100 may be composed of a flexible or semi-flexible material in order to permit at least some bending or curvature, as further described herein with respect to installation of shield 100. One such material which shield 100 may be composed of is high density polyethylene. Another such materials which shield 100 may be composed include other ethylene polymer compositions or other materials having corresponding strength, density and flexibility attributes.

FIG. 2 illustrates shield 100 further comprising attachment areas 112 and buffer components 114. Attachment areas 112 may be provided on one or more wings 108 proximate to their longitudinal ends 102, 104. The attachment areas 112 may be generally selected proximate to longitudinal ends 102, 104 so as to permit a bending, bowing or curvature of shield 100 while shield 100 is installed. A variety of attachment devices and materials are contemplated for attaching shield 100 to a structure, as further described herein. Buffer components 114 may be attached to shield 100. As shown, a plurality of buffer components 114 may be provided at or proximate to center portion 106. Each buffer component 114 may project or protrude from the shield 100 surface. In one embodiment, buffer components are composed of a foam or foam-like material. Buffer component 114 may be secured or attached to shield 100 using any known or to be developed securing material or device. In one embodiment, buffer component 114 may be a neoprene or rubber pad epoxied to shield 100. A plurality of buffer components 114 are contemplated, however a single buffer component 114 extending laterally across a portion of the intermediary portion is also contemplated within the disclosure.

FIG. 2 also shows that the wind turbine tower has a circular shape which presents a concave inner wall of the personal work area. The projecting flange of the concave inner wall of the wind turbine tower presents a hazard within the personal work area. The shield 100 has the potential benefit of both conforming to the concave inner wall in the lateral direction while forming a convex shield between the hazard and the personnel working area in the longitudinal direction. The single piece shield is also readily transportable by personnel climbing the ladder within the wind turbine tower and transporting the shield through openings that may be narrower than the shield's length or width when installed as shown in FIG. 2.

With reference now to FIGS. 3-4, shield 100 may be utilized for increasing personnel safety through installation of shield 100 at or proximate to a hazard 200 in a working environment. In an installed position, shield 100 may be secured to wall or structure 202 at attachment areas 112. The hazard 200 may be covered, shielded, obstructed, or otherwise removed from exposure to a working area 204 of a working environment utilized or frequented by personnel. In one embodiment, and as shown in the figures, wall 202 is the inner wall for a wind turbine tower, hazard 200 is the flange between tower sections of the turbine tower, and working area 204 is a ladder running internal to the tower which personnel may ascend or descend. In this situation, maintenance personnel ascending and descending the tower may on occasion unintentionally strike or contact exposed hazards on the inner wall 200 of the turbine tower. For instance, personnel may hit their head or appendages on projecting flanges 200. Thus, installation of shield 100 may operate to protect the personnel from striking or contacting the flange 200 as they climb the ladder 204.

Shield 100 is shown in FIGS. 3-4 with respect to its utilization with a wind turbine. Persons of ordinary skill however would understand and appreciate that shield 100 could be advantageously utilized in a variety of working environments. For instance, shield 100 may be installed proximate hazards 200 next to a variety of structures which require personnel to climb ladders, including structures such as water towers, buildings, elevator shafts, and other areas and environments where ladders may exist. Working area 204 may not necessarily be a ladder for climbing, but rather could be any environment where personnel or individuals traverse or congregate. For instance, shield 100 may be installed to protect users from hazards 200 found in hallways, building exteriors, tunnels, or any other room or place where hazards may exist. Likewise, a variety of hazards 200 are contemplated within the disclosure. For instance, shield 100 may be installed proximate to any hazard 200 projecting from a wall or structure which individuals may unintentionally contact as they traverse a working area 204. Due at least in part to the flexible or semi-flexible nature of shield 100, the shield 100 may be efficiently secured with a curved wall or structure 202, such as an inner wall of a wind turbine tower. Hazard 200 may also include other risks other than possibly contacting a user. Shield 100 may include thermal-resistant coatings or material, and hazard may be an exposed heat source. Similarly, shield 100 may include insulating material and hazard 200 may be an electrical hazard which could shock an unwary nearby user. As persons of ordinary skill in this art will appreciate, shield 100 may be particularly utilized to protect users from a variety of possible hazards which project towards a working area 204. The curvature of an installed shield 100 allows the shield to cover hazards 200 projecting or extending away from a wall or structure 202.

Although, as discussed, dimensions of shield 100 are variable, for embodiments of shield 100 utilized to protect wind turbine personnel ascending and descending a wind turbine tower, the following dimensions are contemplated. Shield 100 may have a width between about 1 feet and about 4 feet and a length between about 2 feet and 7 feet. The width of wings 108 may be between about 0.5 feet and about 1.5 feet. Wing gaps 110 may be between about $\frac{1}{16}$ of an inch and about 1 inch. Wing gaps may have a length about 1 feet and about 3 feet. The thickness of shield 100 may be between about 0.05 inches and about 0.5 inches. Attachment areas 112 may be defined between about 0.5 inches and about 6 inches from the longitudinal ends 102, 104. Thus, in one example embodiment, shield 100 may have example dimensions of: a shield width about 2 feet and 1.25 inches; a shield length of about 3.5 feet; a wing width of about 8.25 inches; a wing gap of about 0.25 inches; the length of the wing gaps about 1 foot 7 inches; a shield thickness of about 0.16 inches; and attachment areas provided 3 inches from ends 102, 104.

Shield 100 may include attachment devices 120 for connecting, securing, holding together, joining attachment area 112 with a structure attachment area 206 provided on or adjacent to structure 202. Attachments devices 120 are contemplated to be any known or to be developed connector, adhesive, or other securing material or securing device suitable for holding shield 100 to structure 202 in consideration of the environment. The same type of attachment device 120 may be used for all attachment areas 112 and structure attachment areas 206, or a variety of types of securing devices 120 may be utilized. In the embodiments shown in FIGS. 3 and 4, securing device 120 is comprised of an industrial strength adhesive applied to attachment area 112, the backend of a hook and loop fastener such as Velcro® secured by the adhesive to the attachment area 112, industrial strength adhesive further applied to structure attachment area 206, and the backend of an additional hook and loop fastener secured by the adhesive to the structure attachment area 206. Thus, the hook and loop fastener may be joinable with the additional hook and loop fastener thereby securing attachment area 112 with structure attachment area 206.

Installing shield 100 may include the steps of: marking the structure attachment area 206; attaching the additional hook and loop fastener to the structure attachment area 206; and pressing attachment areas 112 of shield 100 onto structure attachment areas 206 thereby securing shield 100 to structure 202. Marking of the secure attachment area 206 may be done with a template sized and dimensioned to ensure accurate measurements and positioning of an installed shield 100. The additional hook and loop fastener may be applied with an adhesive, which in one embodiment may be lines of 5200 marine sealant, and the adhesive may be left to dry for a time period such as overnight. Installation may further include positioning of buffer components 114 such that these are properly aligned with respect to the hazard 200. Shield 100 may be installed for an extensive time period, which in one embodiment may be greater than two months. Additional embodiments of attachment devices 120, as further described, may yield longer or shorter installation duration.

FIGS. 5-8 illustrate additional embodiments of attachment devices 120. FIGS. 5 and 6 illustrate attachment device 120 as a pad or insert connected to attachment area 112 with rivets. Pad 120 may be one of a variety of materials, including for instance a wood or wood composite material. A plurality of passages may be provided through attachment area 112 and aligned with a passage through pad 120. The female end of a rivet may be provided on a side of pad 120 opposed to shield 100, while the male end of the rivet may be insertable through the aligned passages and matable with the female end of the rivet. A washer may also be utilized. A plurality of rivets may thus secure pad 120 to attachment area 112. The pad 120 may itself be secured to structure attachment area 206 by, for instance, an adhesive. FIGS. 7 and 8 similarly illustrate a plurality of rivets holding attachment area 112 of shield 100 to pad 120, however in these embodiments pad 120 is beveled or angled such that the surface of pad 120 adjacent to shield 100 is sloped with respect wall 202. Such an embodiment may further facilitate the bending of shield 100. In one example embodiment, rivets may be substantially composed of nylon and washers may be substantially composed of neoprene.

The descriptions set forth above are meant to be illustrative and not limiting. Various modifications of the embodiments, in addition to those described herein, will be apparent to those skilled in the art from the foregoing description. Such modifications are also intended to fall within the scope of the concepts described herein. Each patent, patent application and publication cited or described in this document are hereby incorporated herein by reference, in their entireties.

The foregoing description of possible implementations consistent with the present disclosure does not represent a comprehensive list of all such implementations or all variations of the implementations described. The description of some implementation should not be construed as an intent to exclude other implementations. For example, artisans will understand how to implement the embodiments in many other ways, using equivalents and alternatives that do not depart from the scope of the disclosure. Moreover, unless indicated to the contrary in the preceding description, none of the components described in the implementations are essential to the embodiments disclosed. It is thus intended that the embodiments be considered as illustrative, with a true scope and spirit of the disclosure being indicated by the following claims.

What is claimed is:

1. A safety system for covering a hazard on a structure positioned proximate to a personnel working area, the safety system comprising:
   a shield having a length in a longitudinal direction and a width in a lateral direction, the shield including first and second wings extending in the longitudinal direction from an intermediary portion of the shield to a first end of the shield, wherein the lateral distance between the first wing and the second wing is a wing gap, first and second additional wings extending in the longitudinal direction from the intermediary portion of the shield to a second end of the shield, wherein the lateral distance between the first additional wing and the second additional wing is an additional wing gap, an attachment area provided on each of the first and second wings at a distance from the first end, and an additional attachment area provided on each of the first and second additional wings at a distance from the second end; and a plurality of attachment devices, each attachment device securing either the attachment area to a structure securing area of the structure or the additional attachment area to an additional structure securing area of the structure;

whereby the intermediary portion of the shield is free of openings and positioned between the hazard and the personnel working area;

wherein the structure is a wind turbine tower, the hazard is a projecting flange of the wind turbine tower, and the personnel working area is a ladder inside the wind turbine tower.

2. The safety system of claim 1, further comprising a buffer component provided on the intermediary portion of the shield.

3. The safety system of claim 2, wherein the shield is in an installed position when the attachment area is secured with the structure securing area, the additional attachment area is secured with the additional structure securing area, and the buffer component is positioned adjacent to the hazard.

4. The safety system of claim 1, wherein the wing gap and the additional wing gap are the same distance.

5. The safety system of claim 4, wherein the shield is symmetrical in both the longitudinal direction and the lateral direction.

6. The safety system of claim 1, wherein each of the plurality of attachment devices includes a first hook and loop fastener secured to either the attachment area or the additional attachment area, and a second hook and loop fastener secured to either the structure securing area or the additional structure securing area.

7. The safety system of claim 1, wherein each of the plurality of attachment devices includes a pad secured to either the structure securing area or the additional structure securing area, and a rivet for securing either the attachment area or the additional attachment area to the pad.

8. The safety system of claim 7, wherein a surface of the pad has a slope with respect to the structure.

9. The safety system of claim 1, wherein the shield is symmetrical in the longitudinal and the lateral directions.

10. The safety system of claim 1, wherein the wind turbine tower presents a concave inner wall of the personal work area that defines the concave inner wall of the wind turbine tower, and the shield conforms to the concave inner wall in the lateral direction while forming a convex shield between the hazard and the personnel working area in the longitudinal direction.

11. The safety system of claim 1, wherein all the wings on one side of the intermediary portion extend parallel to one another.

12. The safety system of claim 1, wherein the intermediary portion has a rectangular shape and extends the entire width of the shield.

13. A safety system for covering a projecting flange of a concave inner wall of a wind turbine tower in proximity to a ladder inside the wind turbine tower, the safety system comprising:

a shield having a length in a longitudinal direction and a width in a lateral direction, the shield including a plurality of wings extending in the longitudinal direction from an intemiediary portion of the shield, and an attachment area provided on each of the plurality of wings, the shield conforming to the concave inner wall in the lateral direction while forming a convex shield between the projecting flange and the ladder in the longitudinal direction; and a plurality of attachment devices, each attachment device securing one of the attachment areas to the structure, whereby the intermediary portion of the shield is positioned between the projecting flange and the ladder.

14. The safety system of claim 13, wherein the plurality of wings includes at least four wings with two wings projecting in one direction and the other two wings projecting in an opposed direction.

15. The safety system of claim 13, wherein the plurality of attachment devices are hook and loop fasteners.

16. The safety system of claim 13 further comprising a buffer component provided on the intermediary portion of the shield.

17. A safety system for covering a hazard on a structure in proximity to a personnel working area, the safety system comprising:

a shield having a length in a longitudinal direction and a width in a lateral direction, the shield including a plurality of wings extending in opposite directions from an intermediary portion of the shield and spaced apart by gaps, wherein all the wings on one side of the intermediary portion extend parallel to one another, and wherein attachment areas are provided on multiple wings; and attachment devices for securing the attachment areas to the structure, whereby the intermediary portion of the shield is positioned between the hazard and the personnel working area, wherein the structure is a wind turbine tower, the hazard is a projecting flange of the wind turbine tower, and the personnel working area is a ladder inside the wind turbine tower.

18. The safety system of claim 17, wherein the intermediary portion has a rectangular shape and extends the entire width of the shield.

* * * * *

UNITED STATES PATENT AND TRADEMARK OFFICE
CERTIFICATE OF CORRECTION

PATENT NO.        : 9,822,537 B2                              Page 1 of 1
APPLICATION NO.   : 14/932547
DATED             : November 21, 2017
INVENTOR(S)       : Gary M. Garcia et al.

It is certified that error appears in the above-identified patent and that said Letters Patent is hereby corrected as shown below:

In the Claims

Column 10, Line 18 reads "intemiediary" should read --intermediary--

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*